United States Patent [19]

Perrella

[11] 4,072,065
[45] Feb. 7, 1978

[54] ADJUSTMENT MECHANISM FOR DAY/NIGHT OUTSIDE MIRROR

[76] Inventor: Guido Perrella, 28 Senneville Road, Senneville, Quebec, Canada

[21] Appl. No.: 677,937

[22] Filed: Apr. 19, 1976

Related U.S. Application Data

[63] Continuation of Ser. No. 430,262, Jan. 2, 1974, abandoned.

[30] Foreign Application Priority Data

Nov. 6, 1973 United Kingdom .............. 51480/73

[51] Int. Cl.² ............................................ F16C 1/10
[52] U.S. Cl. .................................. 74/502; 74/501 M
[58] Field of Search ............... 74/501 M, 501 R, 479, 74/553; 350/279, 281

[56] References Cited

U.S. PATENT DOCUMENTS 2,919,599  1/1960  Milton et al. ................. 74/501 M X
3,811,755  5/1974  Carson ......................... 74/501 M X

*Primary Examiner*—Samuel Scott
*Assistant Examiner*—Frank H. McKenzie, Jr.
*Attorney, Agent, or Firm*—Beveridge, DeGrandi, Kline & Lunsford

[57] ABSTRACT

An apparatus is described which provides for selected positioning of an article such as a rear vision mirror. Such a mirror commonly is located on the exterior of a motor vehicle. The apparatus includes first and second actuators which are adapted to be mounted on a support panel, normally interiorly of the vehicle. The first and second actuators are movable relative to one another, and also relative to the supporting panel. A transmission mechanism is also supported from that panel, and has a pair of independently movable lever elements in operative relation to the relation to the actuators. The transmission mechanism preferably includes flexible wire means having one wire of a predetermined fixed length. The flexible wire means has two opposed ends, one of which is attachable to the article to be positioned, with each of the other of the wire ends being connectable to one of the lever elements. Manipulation of one of the first and second actuators generates a force which acts through the transmission mechanism to cause selective positioning of the article. In a preferred embodiment, detent means are provided in operative relation to the first and second actuators. This detent means serves to position one of the actuators selectively in one of a pair of predetermined locations. Positioning of that actuator causes the article to be realigned to a corresponding predetermined condition or orientation. In the context of a rear vision mirror mounted exteriorly of a vehicle, the predetermined condition to which the mirror can be positioned by the detent means provides for one of day and night reflectivity characteristics for the mirror.

4 Claims, 14 Drawing Figures

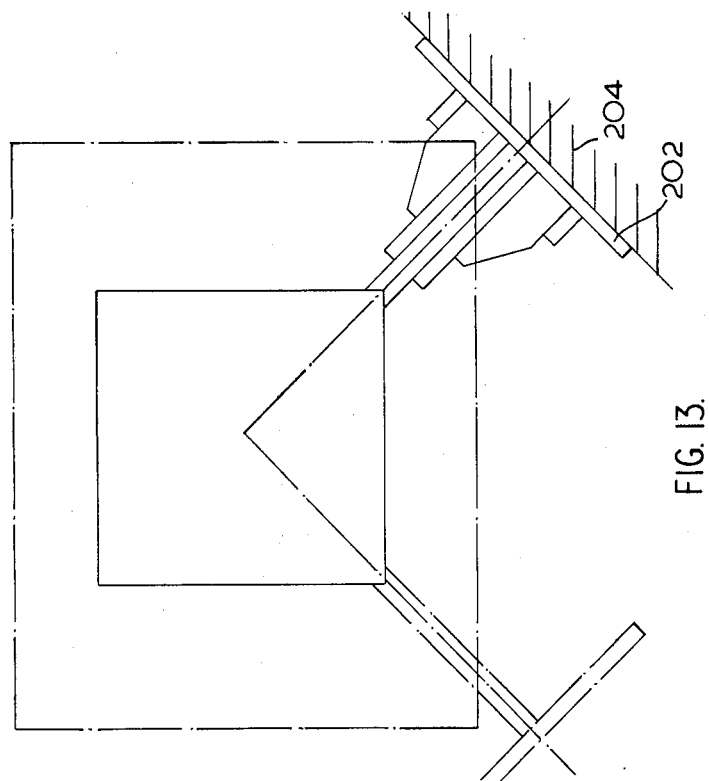
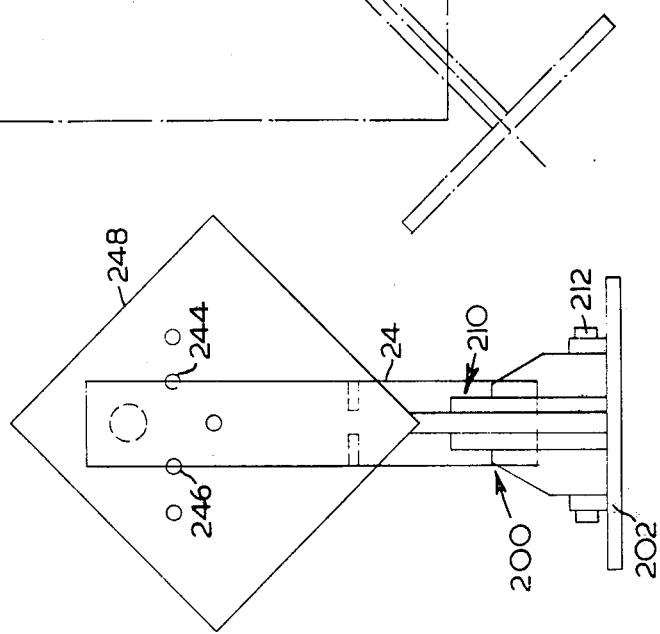
FIG. 13.
FIG. 11.

ADJUSTMENT MECHANISM FOR DAY/NIGHT OUTSIDE MIRROR

This is a continuation, of application serial no. 430,262 filed Jan. 2, 1974, now abandoned.

This invention relates broadly to a mounting and adjustment mechanism. More particularly, the invention relates to an apparatus by which the positioning of an article which in a preferred embodiment comprises an exterior rear view mirror, can be adjusted by remote control.

BACKGROUND OF THE INVENTION

There are many situations and condition under which an article, such as a rear view mirror, prism, or the like, must be positionable with accuracy by remote control. This positioning must be done easily and reliably in order to be fully acceptable. In the context of a motor vehicle, for example, unobstructed rear view vision is important. Interiorly located rear view mirrors are close at hand, and can thus be re-adjusted whenever required. Exteriorly located mirrors are another matter. A continuing problem which has existed in this art is the inadequacy of mechanisms used currently in connection with both mounting and adjusting of exterior rear view mirrors. Perhaps the most common practice has been to adjust exterior, rear view mirrors manually. Manual adjustment can be made required by the driver of a vehicle for that exterior rear view mirror closest to the driver. Such mirrors mounted on the passenger side of the vehicle, however, have seldom been adjusted to take into consideration the particular and differing requirements of various drivers using that vehicle. Thus, the exterior rear view mirror on the passenger side normally was not used to its maximum efficiency.

Some previous attempts have been made at providing arrangements by which exterior rear view mirrors could be adjusted remotely, i.e, from within the vehicle. Although such arrangements enabled some adjustment of the mirror without requiring the window of the vehicle to be opened, they have met with very limited success. The lack of success has partly been due to the relatively high cost of purchasing and/or installation of such mirrors, This high cost often arose from the labour component of the total costs involved in the manufacture and assembly of such prior art structures.

Other drawbacks with prior art arrangements have included mechanical failure due to metal fatigue after a period of time, and/or a certain number of adjustment motions. Excessively rapid wear of certain moving parts has also been a problem, usually being manifest in excessive looseness of the mirror and therefore an inability to maintain the mirror in a selected orientation.

SUMMARY OF THE INVENTION

The present invention overcomes a number of defects in prior art mechanisms used, for instance, for positioning devices or articles such as rear view mirrors. The apparatus to be described herein provides improved reliability. The invention also encompasses apparatus which incorporates significant reduction in the time required to assemble the structure in question.

A preferred form of apparatus embodied by this invention provides for a further improved apparatus by which one of a normal and a reduced reflectivity can be selected. This feature is used commonly in the day/night characteristics of interior, rear view mirrors; but it has very seldom, if ever, been provided in connection with exterior rear view mirrors. A preferred embodiment of this invention makes it possible to position an exterior rear view mirror, for example, by remote control for daytime use, or reposition the mirror for night use, without otherwise altering in any way the adjustment of that mirror. In other words, using a preferred form of apparatus encompassed by this invention, a particular driver can position by remote control an exterior rear view mirror for that person's own convenience and daytime use, then reposition that mirror for reduced glare during nighttime use, and again reposition the mirror for daytime use the next day, all without requiring any further adjustments to the mirror.

Accordingly, there is provided in one embodiment encompassed by this invention an apparatus for providing selected, remotely controlled positioning of an article, such as a rear view mirror, in which there is included first and second actuator means adapted to be carried by a housing attachable to a supporting panel, by which the first and second actuator means are movable relative to one another and relative to said housing; and a transmission mechanism which includes a pair of independently movable lever elements supported in operative relation to the first and second actuator means, the transmission mechanism also including a plurality of flexible wire means at least one of which is of a predetermined, fixed length, each of the wire means having two opposed ends with one of the ends of said wire means being attachable to said article while each of the other of said ends is connectible to one of said lever elements, whereby manipulation of one of the actuator means generates a force acting through the transmission mechanism to cause selective positioning of said article.

In a more preferred form this apparatus includes detent means serving to releasably retain one of said actuator means in a predetermined location, positioning of said one of the actuator means simultaneously causing the article to be oriented in a corresponding predetermined orientation or condition.

The foregoing features and advantages of the present invention will be described more fully below. That description is to be read in conjunction with the accompanying drawings. The drawings illustrate by way of example only, some embodiments of apparatus contemplated by this invention.

BRIEF DESCRIPTION OF THE DRAWINGS

In the drawings

FIGS. 9 to 13 are elevation and plan views showing structural details of another form of the exterior sub-assembly of the apparatus illustrated in FIG. 1.

DESCRIPTION OF THE PREFERRED EMBODIMENTS

Figure 1:
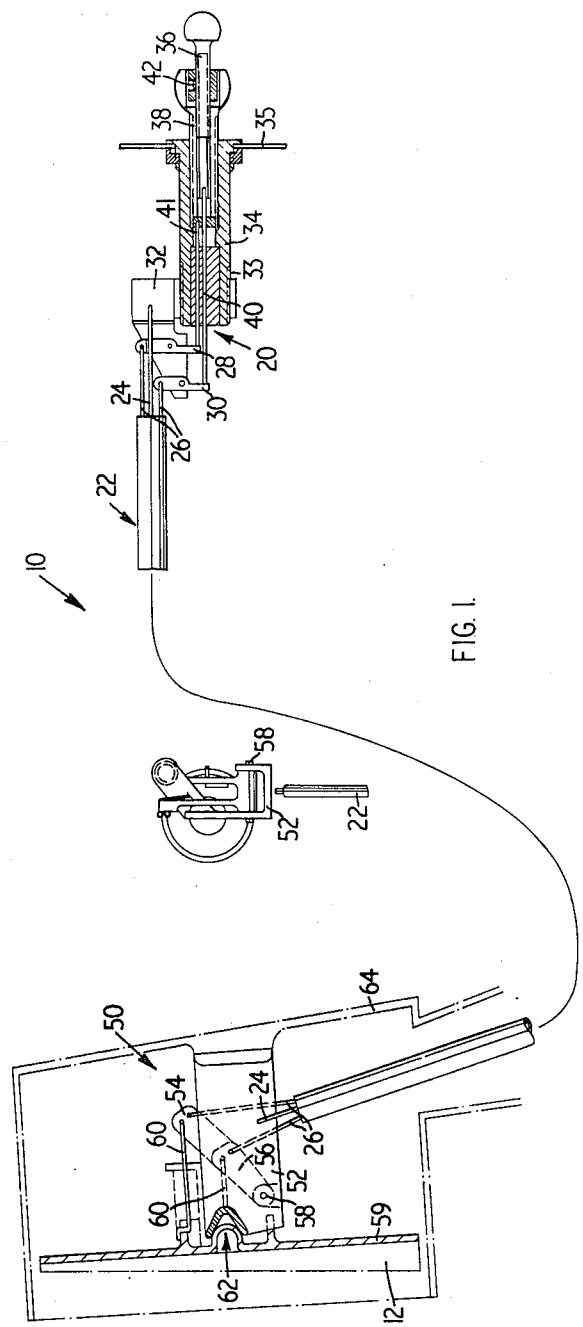
FIG. 1 is a side elevation view taken partly in section longitudinally, and showing schematically one form of apparatus embodied by this invention.

Turning to those drawings, FIG. 1 shows overall at 10 a mechanism contemplated by this invention. In this instance, the mechanism 10 is remotely controlled, and operable for selectively positioning an exteriorly mounted rear view mirror 12. It is appropriate here to digress momentarily and indicate that the present invention contemplates use of the mechanism 10 in various applications requiring remote control, say, in the positioning or locating of a mirror, a prism, or other such article or device. Such other applications could arise in connection with adverse conditions surrounding a workpiece being machined, for instance, or from the need for visual examination of an area not accessible for direct personal observation. The present mechanism 10 will be described here, however, in the context of a vehicle having one or more rear vision mirrors spaced from the location in which a driver would normally be seated. Such rear vision mirrors frequently require adjustment from time to time. This arises from someone accidentally jarring the mirror, from re-locating the driver's seat forwardly or rearwardly relative to the steering wheel, and the like.

Returning to FIG. 1, the mechanism 10 is seen there to include what might be called an interior sub-assembly 20 and an exterior sub-assembly 50. These two sub-assemblies are operatively coupled by flexible wire means 22. The wire means 22 comprise a sturdy reference wire 24, say, a bronze spring wire of about 0.06 inches diameter, which is of a fixed, predetermined length. This length establishes and maintains the spacing between the end connections of two tensioned actuating wires 26. The actuating wires 26 can, for example, also be made of bronze spring wire of about 0.025 inches diameter. Each of the actuating wire 26 is connected to one end of a pair of pivotally mounted input levers 28 and 30, there being one wire 26 connected to each lever. The reference wire 24 is connected to a rigid bracket 32, on which the levers 28 and 30 are mounted. The bracket 32 is itself carried on one threaded end 33 of the actuator support housing 34. The housing 34 is adapted to be releasably secured to a supporting panel 35. This panel 35 is frequently the dash panel of a motor vehicle; although it could also be some other interior panel as well.

The housing 34 is often tubular in form as shown here, and serves to carry a pair of actuating pin members or screws 36 and 38. The screw 38 is, for example, tubular in cross-section and surrounds the solid pin member 36. The pin members 36 and 38 are each movable longitudinally, relative to one another and to the housing 34. Longitudinal movement is provided preferably by screw threads formed exteriorly of each pin member 36 and 38. Rotation of, say, the solid screw member 36 will cause movement of a push pin 40 in a direction parallel to the pin member 36. This movement does one of two things, depending upon whether the movement of pin member 40 is away from, or towards the supporting panel 35. Movement of the push pin 40 away from the supporting panel 35 will cause that pin to push against one end of the level 30. Alternatively, movement of the push pin 40 toward the panel 35 will allow a biasing spring provided in sub-assembly 50 to return the mirror 12 towards a previous, or home position.

Movement of the pin 40 pushing against the lever 30, for example, will apply a pulling force to the associated tensioned actuating wire 26. This pulling force will in turn be transmitted by a mechanism to be described below, to the mirror 12 and cause re-positioning of that mirror.

It is emphasized here that either one of the pin members 36 or 38 can be associated with adjustment of the mirror 12 by movement pivotally about a first datum axis, say, a generally vertically oriented axis. The other pin member will then be used to provide adjustment of the mirror 12 by pivotal movement about a second datum axis. The two datum axes are at right angles to one another, and the second axis will therefore be oriented in a generally horizontal position.

It is also seen from FIG. 1 that each of the rotatable pin members 36 and 38 is enlarged diametrically at the end thereof opposite to the actuating push pins 40 and 41. The enlarged end of the pin member 38 is recessed to house a spring pin which acts as a rotation lock and detent. This is shown at 42, with the detent function occurring to hold the inner pin member 36 releasably in one of two predetermined locations, irrespective of the angular position to which that pin member had been rotated. The two predetermined locations are spaced apart longitudinally of the axis of pin members 36 and 38, so as to cause a realignment or re-positioning of the mirror 12 by a set or fixed amount. This amount is sufficient to cause selected reflection of light incident upon the mirror 12, from either the top exterior surface thereof, or from the coated rear surface thereof. This realignment of the mirror 12 varies the amount of incident light that can be reflected therefrom, from a maximum of about 100% to a greatly reduced amount of about 4%. This realignment is commonly referred to as "day" or "night" positions of the mirror 12 itself.

The interior and exterior sub-assemblies 20 and 50 are interconnected by flexible wire means 22. In order to hold the reference and actuating wires 24 and 26 in a predetermined orientation relative to one another, it is preferable to provide a coating of a moldable polymeric matrix material which is extruded over these wires 24 and 26. The reference and actuating wires 24 and 26 are therefore embedded in place within wire means 22, and will not become entangled with one another.

At some distance remote from the interior sub-assembly 20, the other ends of the reference and actuating wires 24 and 26 are connected to a bracket 52, and levers 54 and 56. These parts are included in the exterior sub-assembly 50. Referring still to FIG. 1, each of the levers 54 and 56 is of a predetermined configuration, and movably mounted on a common pivot pin 58. The free ends of the remote levers 54 and 56 are attached by connector wires 60 to the rear of a mounting plate 59 on which the mirror 12 is carried. The mounting plate 59 is itself pivotally mounted at 62 to the bracket 52 which serves as the article support means. A conventional cover or housing 64 and a supporting base (not shown) complete the sub-assembly 50 and enable the mirror 12 to be mounted on the exterior of a motor vehicle.

It is noted that the connector wires 60 are each secured to the mounting plate 59 at preselected locations. These locations ensure pivotal positioning movement of the plate 59 and mirror 12 in response to extensive or retractive movement of one of the actuating wires 24 and 26, independently of the other. In other words, side to side positioning of the mirror 12 is derived independently of top to bottom positioning thereof, and vice versa.

Figure 2:
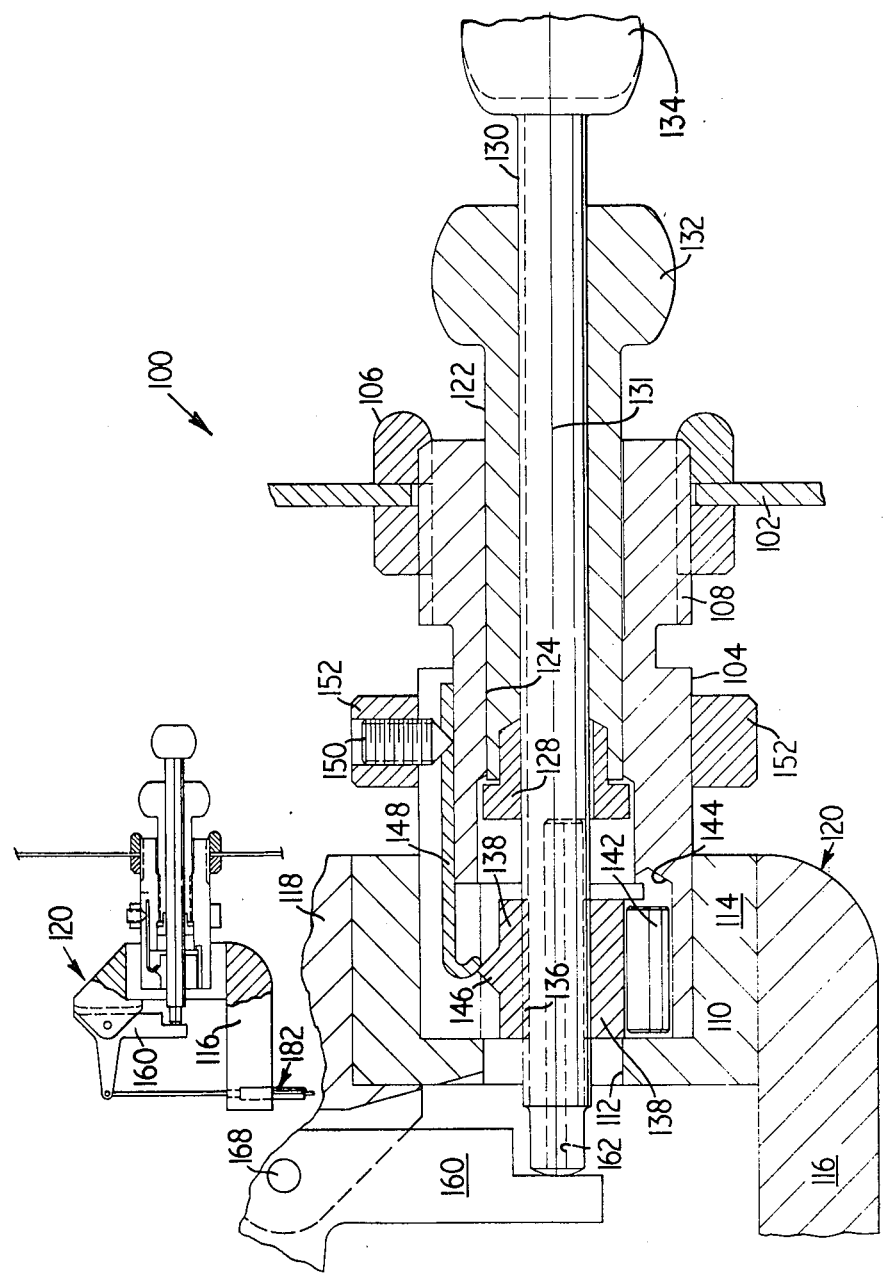
FIG. 2 is also a side elevation view, taken partly in section longitudinally to show structural details of a preferred structure of one portion or sub-assembly of the apparatus of FIG. 1.

A more preferred form of apparatus embodied by this invention is shown in FIGS. 2–13. With particular reference to FIGS. 2–5, a preferred form of an interior sub-assembly is shown in FIG. 2 at 100; while a preferred form of exterior sub-assembly that is connected to the former is shown in FIGS. 9–13 at 200.

The interior sub-assembly 100 is mounted in an aperture formed in an interior mounting panel 102. This panel 102 normally will be the dash panel of a motor vehicle, or could be some other interior panel as well. In any event, a tubular barrel or housing 104 is releasably secured in the aperture in the panel 102 by means of a Bezel nut 106. The Bezel nut 106 engages threads 108 on one end of the barrel or housing 104. The other end of the barrel 104 is closely received in a diametrically enlarged portion 110 of an opening 112 which extends through a collar 114 that is brazed, welded or otherwise fixedly secured to sections 116 and 118 to define a generally L-shaped bracket 120.

Figure 3:
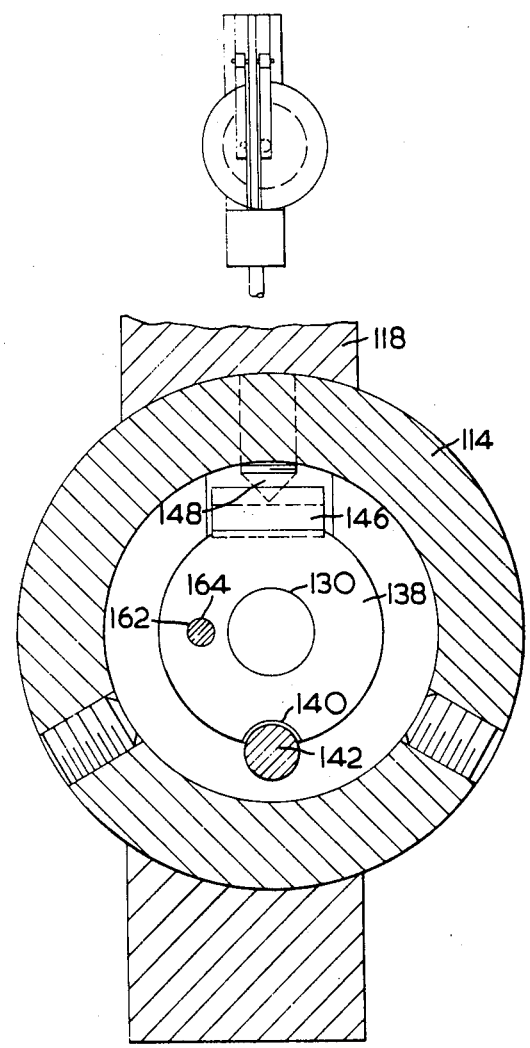
FIG. 3 is an end elevation view taken in section along line 3—3 of FIG. 2.

The collar 114 is preferably circular in cross-section as seen in FIG. 3. Similarly, the barrel or housing 104 is also preferably of a circular cross-section. The barrel or housing 104 surrounds a tubular outer screw 122 which is exteriorly threaded to engage corresponding threads shown at 124 on the interior surface of the barrel or housing 104. Rotation of the tubular screw 122 will by virtue of the engagement of the threads at 124 cause that screw to travel either inwardly or outwardly of the barrel 104. The interior end of the tubular screw 122 is provided with a diametrically enlarged recess 126 in which a collar-like stop member 128 is fitted. The purpose of stop member 128 will become apparent shortly.

A solid center screw 130 is received in the interior of the outer tubular screw 122. There is free, relative movement possible between the screws 122 and 130, both axially of the screws and rotationally about their common axis shown at 131. Both of the screws 122 and 130 have an enlarged end or head shown at 132 and 134. These heads 132 and 134 are preferably roughened as by knurling, or the like. The center screw 130 extends through the outer tubular screw 122 and stop element 128 to be in threaded engagement as shown at 136 with an internally threaded detent nut 138. The detent nut 138 is formed with a keyway 140 which coacts with a key 142 seated in a recess 144 formed in the inner end of barrel or housing 104. The key 142 in keyway 140 prevents rotation of the detent nut 138. The detent nut 138 is provided with a radially outwardly projecting stop 146 that is intended to coact with a plate-like spring detent 148. For convenience the stop 146 on detent nut 148 is located generally diametrically opposite to the keyway 140. The spring detent 148 is held fast by means of a set screw 150 that is in threaded engagement with a collar 152 provided on the exterior of the barrel or housing 104. By means of the set screw 150, it is possible to vary the extent by which the stop-engaging U-shaped shaped end of the spring detent 148 projects beyond the bottom of the recessed end of barrel 104. It will be seen from FIG. 2 that the threaded interconnection between the center screw 130 and detent nut 138 which in turn has the stop 146 coacting with the spring detent 148 will permit a preselected amount of longitudinal displacement of the center screw 130. The purpose of this longitudinal displacement will be explained below.

It is seen from FIG. 2 that the end of center screw 130 opposite to the enlarged head 134 extends through the detent nut 138 and aperture 112 in the collar 114, to abut against one free end of an L-shaped lever 160. Thus, rotation of the center screw 130 will cause that screw to function as a push pin acting against that one free end of the lever 160. The stop element 128 associated with the outer screw 122 abuts against one end of an actuator pin 162. This actuator pin 162 is slideably received in an opening 164 of corresponding cross-sectional shape, and formed in the detent nut 138. The other end of the actuator pin 162 abuts against one free end of another L-shaped lever 166. Each of the lever elements 160 and 166 is rotatably mounted upon a common pivot pin 168 that is carried by the portion 118 of bracket 120.

Figure 4:
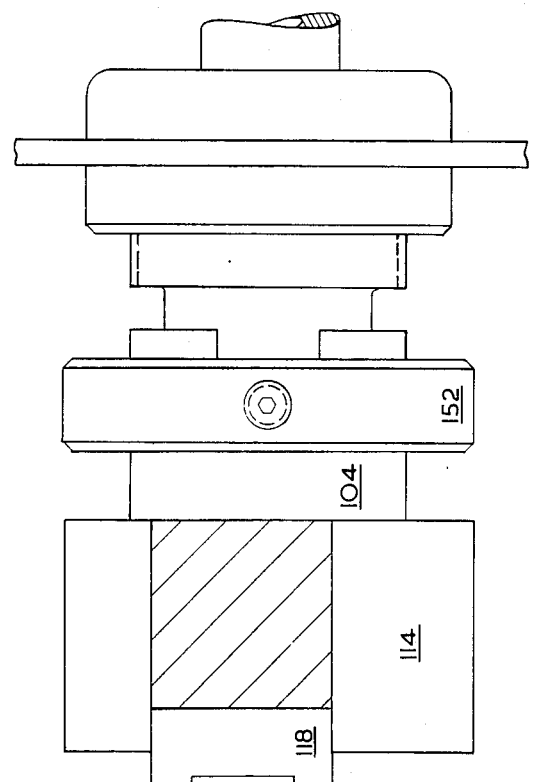
FIG. 4 is a top plan view of the structure of FIG. 2.
Figure 5:
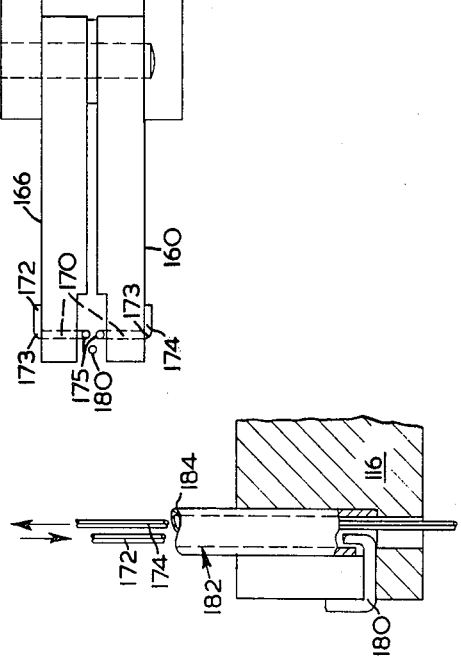
FIGS. 5 to 8 inclusive show details of the end connections of reference and actuating wire means of the apparatus contemplated herein.

The other free end of each of the L-shaped lever elements 160 and 166 is apertured as shown at 170 in FIG. 4. One end of a pair of tensioned actuating wires 173 and 174 is received in the apertures 170, being pivotally secured to the lever elements 160 and 166 by means of a pair of right-angled bends 173 and 175. By means of the offset right-angled bends 173 and 175, each of the actuating wires 172 and 174 is pivotally movable within the apertures 170. This pivotal movement has the advantage of minimizing any metal fatigue which might occur and cause premature failure of the connection between actuating wires 172 and 174, and the lever elements 160 and 166.

The tensioned actuating wires 172 and 174 coact with a sturdy reference wire 180 which has one end thereof pivotally connected to the free end of the portion 116 of bracket 120. The pivotal interconnection between the reference wire 180 and bracket 120 is obtained by again providing a pair of right-angled bends in the wire 180. It is to be noted that reference wire 180 is maintained in compression, whereas the actuating wires 172 and 174 are in tension. The reference wire 180 serves to provide a predetermined, fixed length for a flexible wires means 182 which is made up of the three wires 172, 174 and 180, embedded with an extruded jacket or cover 184. For mechanical strength reasons it is preferable that the wires 172, 174 and 180 be located substantially in one plane, with the reference wire 180 being disposed as the uppermost one of the trio of embedded wires in flexible wire means 182. The reference wire 180 is sturdier than either of the actuating wires 172 and 174. These latter wires can, for instance, be made of stainless steel spring temper wire of type 304 and having a diameter of 0.025 inches. The reference wire 180, on the other hand, could be a bronze spring wire of a larger diameter of approximately 0.059 inches, as mentioned earlier.

It can be seen from FIGS. 2 and 4 that the tubular screw 122 and center screw 130 will function as actuating members. By rotation of either of the screws 122 or 130, the screw selected will be caused to move longitudinally thereof. With normal right hand threads being provided at 124, clockwise rotation of the outer screw or actuating member 122 will cause that screw to enter more deeply into the barrel or housing 104. That movement would be from right to left as seen in FIG. 2. In so moving, the stop member 128 carried by the screw 122 would push against the actuator pin 162, causing the latter to push against the one free end of the pivotally mounted lever 166. The lever 166 will tend to move in a clockwise direction as seen in FIG. 2, thus causing the other free end of lever 166 to exert a pull on the tensioned actuating wire 172. Such a pull will cause adjustment or repositioning of the mirror to which the other end of that wire 172 is attached. This will be explained below, in connection with FIGS. 9–13. It should also be noted here that for similar right hand threads being provided at 136, clockwise rotation of the center screw 130 will similarly cause movement of that screw in a direction from right to left as seen again in FIG. 2. Such movement will similarly cause a pulling force to be exerted through the lever 160 to the other tensioned actuating wire 174.

Figure 8:
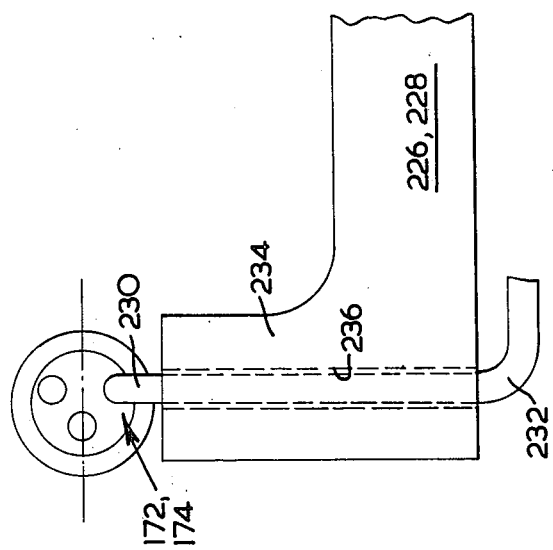
Figure 7:
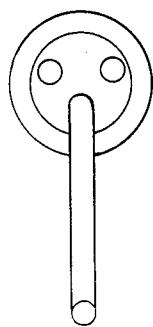
Figure 6:
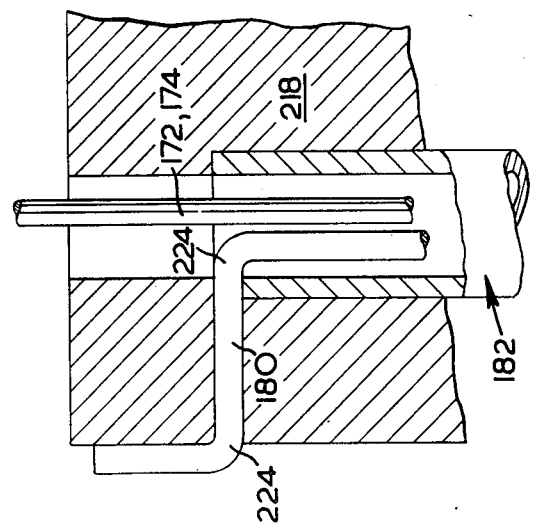
Figure 9:
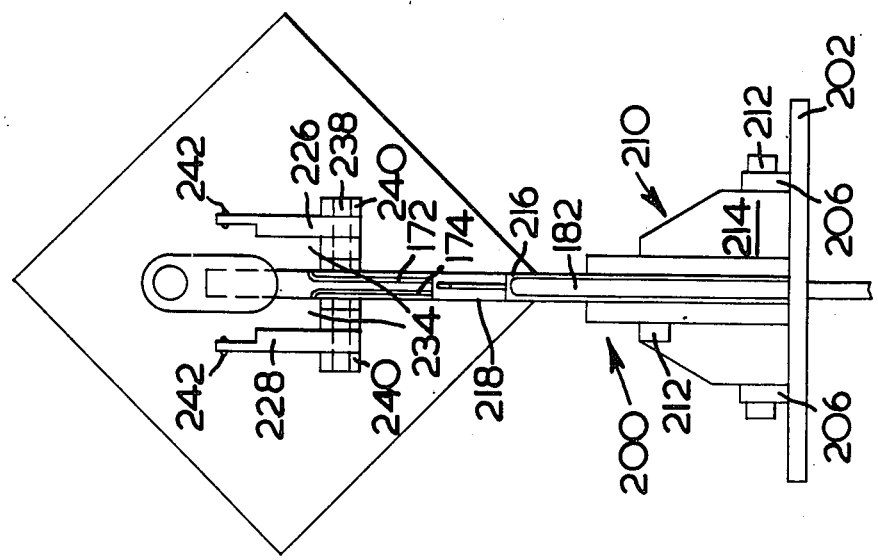
Figure 12:
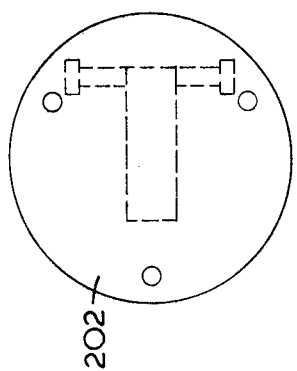
Figure 10B:
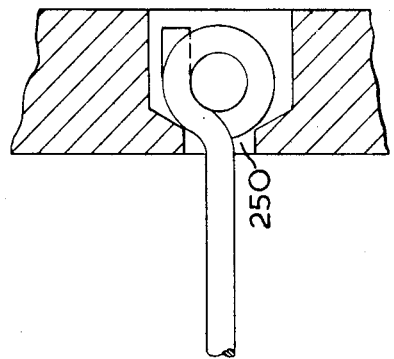
Figure 10A:
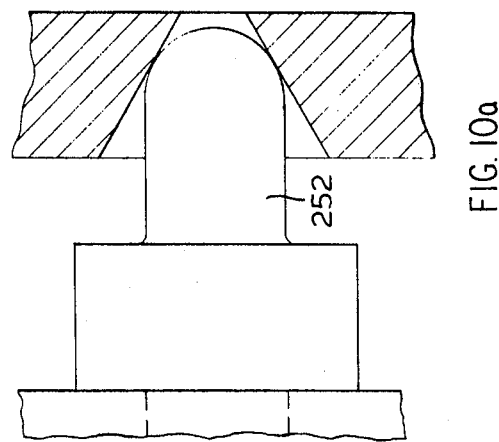

Turning now to FIGS. 9-13, the exterior sub-assembly 200 includes a suitably shaped mounting plate 202 that is adapted to be fixedly secured to a body or door panel 204 exteriorly of a motor vehicle. The mounting plate 202 is provided with a pair of projecting lugs 206 to which a somewhat T-shaped supporting bracket assembly 210 is attached by fastening means 212. The bracket assembly 210 includes a base portion 214 and a body portion 216 which is oriented generally in a plane at right angles to the plane of the base portion 214. Formed on the body section 216 is a boss-like flange 218. This flange 218 is apertured in order to receive the other end of the flexible wire means 182. The flexible wire means 182 are received in a central opening 220 which extends through the flange 218 in a direction generally parallel to the length of the body section 216. A transversely extending opening 22 extends generally at right angles from the central opening 220 to the exterior edge face of the flange 218. The other end of the reference wire 180 is provided with a pair of offset right angled bends 224 which serve to secure the other end of that reference wire 180 pivotally to the flange 218. The other end of each of the tensioned actuating wires 172 and 174. projects beyond the flange 218 and is connected to one free end of a pair of pivotally mounted V-shaped actuating levers 226 and 228. More specifically, the other ends of the actuating wires 172 and 174 are also provided with a pair of offset right angled bends 230 and 232 which enable those ends of the wires to be secured pivotally to an L-shaped projection 234 formed on said one free end of each of the actuating levers 226 and 228. This is best seen in FIGS. 8 and 9. Each of the projections 234 is provided with an opening 236 which receives and pivotally journals the ends of the tensioned actuating wires 172 and 174.

Figure 10:
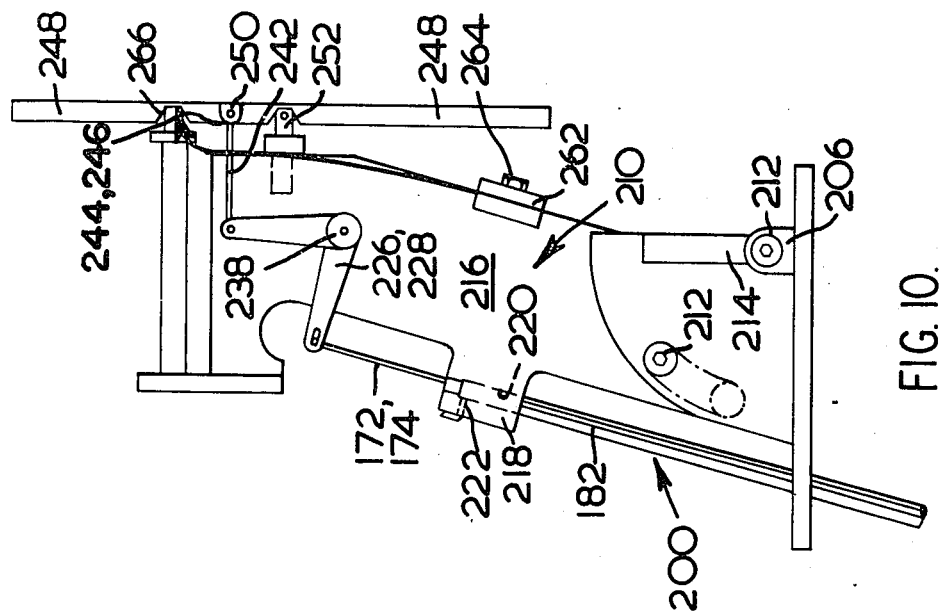

The V-shaped actuating levers 226 and 228 are supported in spaced apart relation on a pivot pin 238. A pair of C-ring retaining collars 240 are press-fitted over the ends of the pin 238 to secure the levers 226 and 228 in position. As seen in FIG. 10, the other free end of each of the actuating levers 226 and 228 is secured by means of a pair of connector wires 242 to spaced apart locations 244 and 246 on a mirror retaining plate 248. The positions 244 and 246 are best seen in FIG. 11. For convenience, the ends of the connector wires 242 are attached to the mirror retainer plate 248 by means of a pigtail which is seated in a countersunk opening 250 formed in the retainer plate 248. The mirror retainer plate 248 is itself pivotally supported on a projection 252 that has a hemispherical end formed thereon. The projection 252 is fixedly secured to one edge face of the body portion 216 of the support bracket assembly 210.

In order to spring load the mirror retainer plate 248 and a mirror supported thereon, biasing means are provided on the support bracket assembly 210. With reference to FIG. 10, the spring bias is provided preferably by means of a flat spring 260 that has washer plates 262 provided on opposite sides thereof and each provided with aligned openings to receive fastening means 264 that secures the spring 260 firmly to the bracket assembly 210. The flat spring 260 is slotted in order to slip over the body portion 216 and the mounting pin 252. The free end of the biasing spring 260 is curled somewhat, and is seated in a tapered slot 266 formed in the rear face of the mirror retainer plate 248. As an alternative arrangement, the tapered slot 266 could also receive the free end of a stem that is biased by means of a wound compression spring that similarly causes preloading of the mirror retainer plate 248.

It will be seen from FIGS. 9-13, that as a pulling force is exerted by one of the actuating screw members 122 or 130 onto the actuating wires 172 and 174, there will be a tendency for a related one of the actuating levers 226 or 228 to pivot in a counter clockwise direction, as seen in FIG. 10. A similar pulling force will be transmitted through the connector wire 242 to the retainer plate 248 and thus cause repositioning of the mirror carried by that retainer plate.

It is preferable that the center screw member 130 be connected through to the mirror retainer plate 248 in such a way that rotational manipulation of that actuating screw member will cause side to side repositioning of the mirror. That is to say, repositioning of the mirror by pivotal movement about a generally vertically oriented axis is derived preferably from manipulation of the center actuating screw 130. It is also preferable that the detent 146 and spring 148 function to provide for a "seated" and "retracted" position of that center actuating screw 130. Movement of the center screw member 130 between those two positions will occur longitudinally and parallel to the axis 131. Moreover, such movements will enable the spring biasing the retainer plate 248 to cause a fixed and predetermined amount of realignment or orientation of the mirror carried on the retainer plate 248. The fixed amount of realignment will cause light incident upon the mirror and which normally reflects from the silvered rear surface of the mirror to now be reflected from only the outer surface of the mirror. This characteristic is well known, per se, in the context of interior rear vision mirrors which have a "day vision" and "night vision" capability. By providing the predetermined amount of realignment, it is possible to reduce the glare of headlights at night from approximately 100% of the light incident upon the mirror, to a greatly reduced amount of only about 4% of the incident light.

It is also emphasized that in the context of this invention, longitudinal movement of the center actuating screw 130 will occur without causing any other repositioning of the orientation of the rear vision mirror to which it is connected. Thus it is possible for one driver to position the mirror for the maximum efficiency of rear vision for that person, and then be able to shift between day and night reflectivity of light incident upon the mirror and coming, say, from the headlights of vehicles behind that person.

It was mentioned earlier that side to side positioning of the mirror carried by retainer plate 248 was preferably derived from actuating the center screw 130. Since most rear view mirrors have a side to side dimension which generally exceeds the top to bottom distance, a further advantage is derived by also having the shift capability for selecting either day or night conditions of reflectivity associated with that center screw 130. It is well known that as one vehicle passes another, there is a so-called blind spot slightly behind and to the side of the vehicle being passed, and in which the passing vehicle cannot be seen. The shifting capability of the mirror from day to night characteristics about a generally vertically extending axis has the advantage that, at night, the repositioned mirror will provide added viewing coverage for the area otherwise falling in the driver's blind spot. In other words, with the mirror shifted on a side to side basis for night glare conditions for a given driver, the glare of headlights of a vehicle passing through the driver's blind spot will be visible momentarily as the passing vehicle overtakes that driver. This feature provides an additional measure of safety that has not previously been possible with prior art mirror arrangements. Moreover, it is thought that the capability of providing for a selection of day or night conditions of reflectivity of light incident upon an exterior rear view mirror is also unique to this art.

The foregoing disclosure has described a number of embodiments envisaged by this invention. Some alternative constructions have been shown and suggested. It is intended within the spirit of this invention to encompass all such changes and modifications as would be apparent to those skilled in this art, and which fall within the scope of the claims below.

What I claim is:

1. Apparatus for providing selective positioning of an article on an article support means by movement of a vertical actuator and a horizontal actuator on an actuator support means, comprising,
    a reference wire of fixed length connecting the actuator support means with the article support means,
    a pair of movable input lever elements supported for pivotal movement with respect to the actuator support means and each being operatively connected to a respective one of said actuators,
    a pair of longitudinally movable wires ech having a first end connected to one of said movable input lever elements, said wires being movable independently of each other,
    a pair of movable remote lever elements supported for pivotal movement with respect to the article support means, said remote lever elements being operatively connected to said article to effect respective vertical and horizontal movement thereof,
    said longitudinally movable wires each having a second end connected to one of said movable remote lever elements to permit independent vertical and horizontal movement of said article by respective movement of said vertical actuator and said horizontal actuator.

2. The apparatus defined in claim 2, wherein detent means are provided in operative relation to said actuator means, the detent means serving to position one of said actuator means selectively in one of a pair of predetermined locations, positioning of said one actuator means causing said article to be realigned to a corresponding predetermined condition.

3. The apparatus defined in claim 2, wherein said article is a rear vision mirror mounted exteriorly of a vehicle, and said predetermined condition to which said mirror can be positioned by the detent means provides for one of day and night reflectivity characteristics for said mirror.

4. An apparatus for providing selected, remotely controlled positioning of an article, such as a rear view mirror, in which there is included first and second actuator means adapted to be carried by a housing attachable to a supporting panel, by which the first and second actuator means are movable relative to one another and relative to said housing; and a transmission mechanism which includes a pair of independently movable lever elements supported in operative relation to the first and second actuator means, the transmission mechanism also including a plurality of flexible wire means at least one of which is of a predetermined, fixed length, each of the wire means having two opposed ends with one of the ends of said wire means being attachable to said article while each of the other of said ends is connectible to one of said lever elements, whereby manipulation of one of the actuator means generates a force acting through the transmission mechanism to cause selective positioning of said article.

* * * * *